United States Patent [19]

Tellvik et al.

[11] Patent Number: 4,769,274
[45] Date of Patent: Sep. 6, 1988

[54] RELATIVELY INEXPENSIVE THERMOFORMABLE MAT OF REDUCED DENSITY AND RIGID LAMINATE WHICH INCORPORATES THE SAME

[75] Inventors: Bengt A. Tellvik, Allentown, Pa.; Andrew J. Manning, Randolph, N.J.; Douglas C. Woerner, Northampton, Pa.

[73] Assignee: Tarkett Inc., Parsippany, N.J.

[21] Appl. No.: 943,870

[22] Filed: Dec. 22, 1986

[51] Int. Cl.⁴ .............................................. D21H 5/20
[52] U.S. Cl. .................................... 428/218; 156/245; 156/309.6; 156/309.9; 162/146; 162/164.1; 162/164.6; 162/164.7; 162/168.1; 162/169; 162/181.1; 162/181.2; 162/181.3; 162/181.4; 162/181.5; 162/181.6; 428/174; 428/534
[58] Field of Search .................. 162/146, 164.1, 164.6, 162/164.7, 168.1, 169, 181.1, 181.2, 181.3, 181.4, 181.5, 181.6; 156/245, 309.6, 309.9; 428/218, 174, 534

[56] References Cited

U.S. PATENT DOCUMENTS

| | | | |
|---|---|---|---|
| 3,325,345 | 6/1967 | Hider . | |
| 4,225,383 | 9/1980 | McReynolds | 162/146 |
| 4,379,808 | 4/1983 | Cole et al. | 162/181.1 |
| 4,451,539 | 5/1984 | Vallee et al. . | |
| 4,481,075 | 11/1984 | Dailly et al. | 162/183 |

FOREIGN PATENT DOCUMENTS 1453503 10/1976 United Kingdom .

Primary Examiner—James C. Cannon
Attorney, Agent, or Firm—Burns, Doane, Swecker, & Mathis

[57] ABSTRACT

A relatively inexpensive mat is provided which through the application of heat and pressure readily can be densified to form rigid shaped articles having a reduced overall density. The mat is substantially free of a binder (e.g., a latex binder) and consists essentially of a substantially radom array of (a) relatively coarse cellulosic fibers, (b) thermoplastic synthetic polymer fibrils, (c) non-fibrous thermoplastic synthetic polymer particles, (d) substantially void-free substantially water-insoluble particulate inorganic material (e.g., talc), and (e) particulate void-containing substantially water-insoluble inorganic material (e.g., expanded volcanic glass) having a lesser density than component (d) in the specified quantities. A plurality of the mats while stacked together with similar mats of greater density on at least the upper and lower surfaces may be subjected to heat and pressure to accomplish densification and thermal bonding within and between adjoining mats to form a laminate. The presence of component (e) in conjunction with the other components has been found to enable the efficient control of the density in the resulting product regardless of the pressure applied during thermoforming. The resulting cellulosic fiber reinforced product can be used to advantage as a shaped rigid lightweight panel for use as an inner automobile door liner or in similar end uses which require a rigid sheet or panel having a predetermined configuration. A decorative surface optionally may be applied to the resulting article.

29 Claims, 1 Drawing Sheet

U.S. Patent    Sep. 6, 1988    4,769,274
FIG. 1
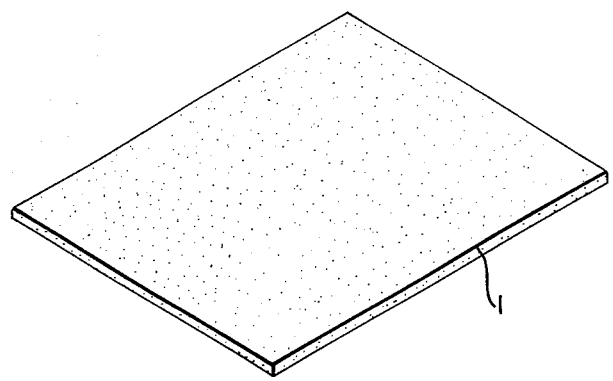
FIG. 2
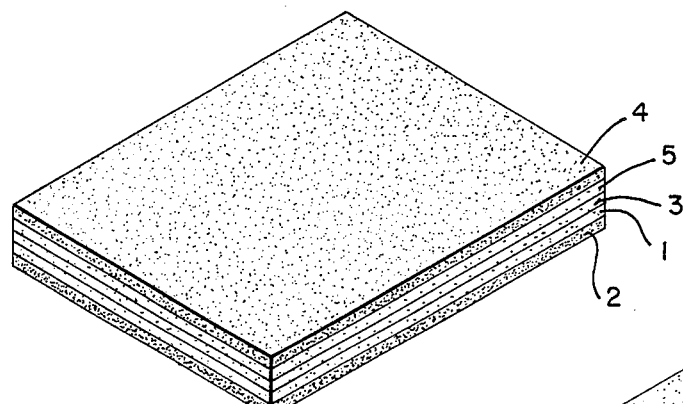
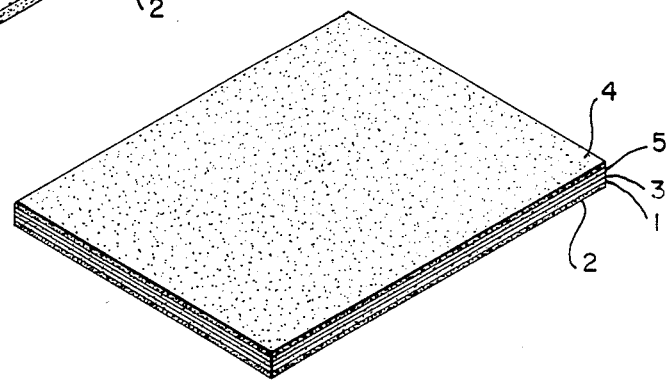
FIG. 3
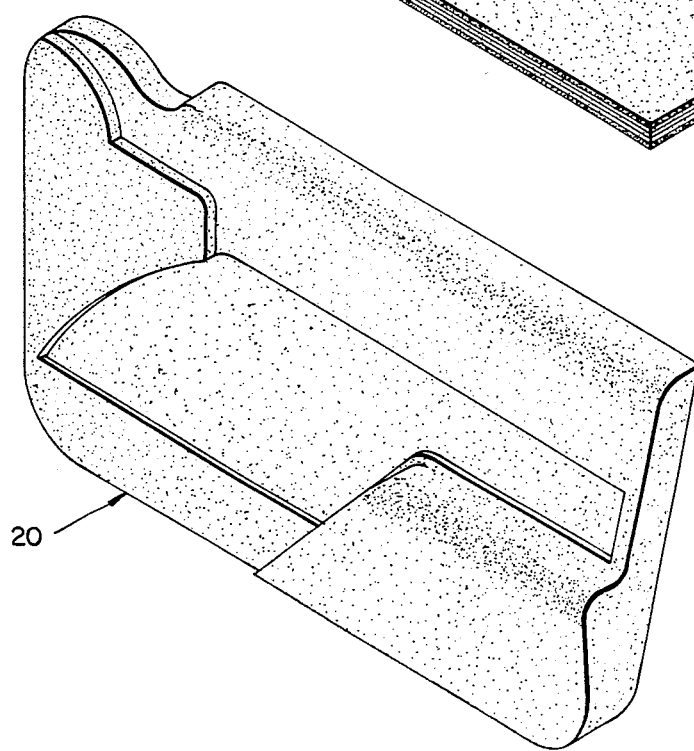
FIG. 4 und 4,769,274

RELATIVELY INEXPENSIVE THERMOFORMABLE MAT OF REDUCED DENSITY AND RIGID LAMINATE WHICH INCORPORATES THE SAME

BACKGROUND OF THE INVENTION

The plastics industry has long used particulate fillers and selected reinforcing fibers within thermosetting resins, and more recently within thermoplastic resins. Also, the automotive industry has long used resin impregnated fiber mats to form trunk liners, door panels, etc. This technology has also led to the development of certain thermoformable compositions containing natural fibers, and thermosetting or thermoplastic polymeric materials.

In U.S. Pat. No. 3,325,345 to Hider is disclosed the formation of a water-laid product comprising relatively fine fibrillated cellulosic fibers, and a particulate thermoplastic polymer. The relatively fine nature of the cellulosic fibers has tended to complicate water removal during the formation of the product.

In U.S. Pat. No. 4,451,539 to Vallee is disclosed a thermoformable material comprising reinforcing fibers, a fibrous polyolefin dough, particulate thermoplastic polymer, and a binder. The presence of the fibrous polyolefin dough in a substantial concentration has added significantly to the cost of the product. Also, the binder has added a significant production cost.

In British Patent No. 1,453,503 to Solvey & Cie is disclosed a thermoformable sheet comprising vegetable fibers and synthetic polymer fibers. Inorganic fillers may be included in such compositions. The presence of the synthetic polymer fibers in a substantial concentration has added a significant production cost.

The use of low density particulate fillers in certain polymers and fiber-containing sheet products has been disclosed in the past.

It is an object of the present invention to provide a novel thermoformable mat of reduced density having acceptable mechanical properties which can be produced on a relatively economical basis.

It is an object of the present invention to provide a novel soft and flexible thermoformable mat of reduced density which can be readily handled and transported without damage prior to utilization.

It is an object of the present invention to provide a novel thermoformable mat of reduced density having satisfactory mechanical properties which can be formed and molded on a relatively expeditious basis.

It is an object of the present invention to provide a novel thermoformable mat of reduced density which incorporates thermoplastic polymeric components and overcomes the lengthy molding times associated with compositions of the prior art which incorporate thermosetting polymeric materials.

It is an object of the present invention to provide a novel thermoformed laminate comprising cellulosic fibers and consolidated thermoplastic resin which exhibits superior impact resistance when compared to products which employ a thermoset resin or unfilled injection molded plastics.

It is an object of the present invention to provide a novel thermoformable mat of reduced density which is substantially free of a costly binder.

It is an object of the present invention to provide a novel thermoformable mat of reduced density having satisfactory mechanical properties which contains a relatively low concentration of relatively expensive thermoplastic polymer fibrils together with less expensive non-fibrous thermoplastic synthetic polymer particles.

It is another object of the present invention to provide a novel thermoformable mat of reduced density which while stacked together with similar mats of greater density on at least the upper and lower surface may be subjected to heat and pressure to accomplish densification and thermal bonding within and between adjoining sheets to form a laminate.

It is another object of the present invention to provide a novel thermoformed laminate of the skin-core type wherein density of the interior is less than the density of the surfaces.

It is a further object of the present invention to provide a novel thermoformed laminate of good uniformity and reduced density which can be used to advantage as a shaped rigid panel for use as an inner automobile door liner or in similar end uses which require a rigid sheet or panel having a predetermined configuration.

It is a further object of the present invention to provide a novel thermoformed laminate of the skin-core type which possesses superior physical properties such as bending modules, heat deflection, etc.

It is yet another object of the present invention to provide a novel thermoformed laminate of reduced density to which a decorative surface optionally may be readily applied.

These and other objects, as well as the scope, nature, and utilization of the claimed invention will be apparent from the following detailed description and appended claims.

SUMMARY OF THE INVENTION

A relatively inexpensive mat having a single ply thickness of approximately 15 to 60 mils and a density of approximately 20 to 40 lbs./ft.$^3$ capable of undergoing densification and thermoforming upon the application of heat and pressure consists essentially of a substantially random array of:

(a) approximately 15 to 35 percent by weight on a dry basis of natural relatively coarse cellulosic fibers having a Canadian standard freeness at 0.3 percent consistency greater than 600 ml., (b) approximately 10 to 25 percent by weight on a dry basis of thermoplastic synthetic polymer fibrils having a melting temperature below 450° F., (c) approximately 15 to 30 percent by weight on a dry basis of substantially non-fibrous thermoplastic synthetic polymer particles having a melting temperature below 450° F, (d) approximately 25 to 40 percent by weight on a dry basis of substantially void-free substantially water-insoluble particulate inorganic material, and (e) approximately 10 to 20 percent by weight on a dry basis of particulate void-containing substantially water-insoluble inorganic material having a lesser density than component (d), with the mat being substantially free of a binder and the components (c), (d), and (e) being substantially dispersed among and substantially physically retained via entrapment by the components (a) and (b).

A cellulosic fiber reinforced thermoformed laminate is provided which is formed by the application of heat and pressure to a plurality of the mats of the present invention while in a stacked configuration together with similar mats of greater density on at least the upper and lower surfaces which contain less of component (e) and more of component (d) wherein the stacked mats are heated at a temperature in excess of the melting temperature of the thermoplastic synthetic polymer of components (b) and (c) and densification takes place within said mats and thermal bonding takes place within and between adjacent mats, the thermoformed laminate having a lesser density at a central location within the range of approximately 50 to 65 lbs./ft.$^3$ and a greater density at the upper and lower surfaces within the range of approximately 60 to 75 lbs./ft.$^3$.

DETAILED DESCRIPTION OF THE DRAWINGS

FIG. 1 depicts a single ply of a thermoformable mat of reduced of the present invention.

FIG. 2 depicts three stacked plies of a thermoformable mat of reduced density of the present invention together with similar mats of greater density on the upper and lower surfaces which lack component (e) and substitute in its place an additional quantity of component (d).

FIG. 3 depicts a laminate formed from the five stacked plies of FIG. 2 following the application of heat at a temperature in excess of the melting temperature of components (b) and (c) and pressure wherein densification and thermal bonding within and between adjacent mats took place. Following the application of such heat and pressure, the individual ply density commonly will no longer be visually apparent.

FIG. 4 depicts a representative contoured inner automobile door liner panel formed by thermoforming a large segment of the five stacked plies of FIG. 2.

DESCRIPTION OF THE PREFERRED EMBODIMENTS

The relatively inexpensive thermoformable mats of reduced density of the present invention may be formed by wet-laying from a liquid dispersion or by air-laying wherein the required components are present in appropriate concentrations as indicated. As discussed in detail hereafter, the thermoformable mats of the present invention comprise (a) natural relatively coarse cellulosic fibers, (b) thermoplastic synthetic polymer fibrils, (c) thermoplastic synthetic polymer particles, (d) substantially void-free substantially water-insoluble particulate inorganic material, and (e) particulate void-containing substantially water-insoluble inorganic material. In all instances the resulting mats are substantially free of a binder (e.g., a polymer latex binder) which would add significantly to the cost of production. In the resulting product components (c), (d), and (e) are substantially dispersed among and substantially physically retained via entrapment by components (a) and (b) in spite of the lack of reliance upon a binder to provide cohesiveness. It surprisingly has been found that the highly satisfactory product of the present invention can be formed even in the absence of such a binder. The resulting product is capable of being handled and shipped prior to thermoforming (as described hereafter) while retaining its physical integrity. Also, segregation of the various components surprisingly does not occur to any significant degree prior to densification and thermoforming. There is no significant loss of the particulate components present therein.

The thermoformable mats of the present invention commonly have a thickness of approximately 15 to 60 mils and a density of approximately 20 to 40 lbs./ft.$^3$ prior to undergoing densification and thermoforming. In a particularly preferred embodiment the mats have a thickness of approximately 30 to 45 mils and a density of approximately 20 to 30 lbs./ft.$^3$ prior to densification and molding. Such mats conveniently may be provided as discrete sheets or as a continuous roll.

Relatively coarse cellulosic fibers constitute the first essential component of the thermoformable mats of the present invention. Any cellulosic fibers commonly used in the manufacture of felt and paper can be selected so long as they possess the requisite coarseness. Such fibers can be economically provided and constitute approximately 15 to 35 percent on a dry basis of the resulting mat. In a preferred embodiment the cellulosic fibers are present in the mat in a concentration of approximately 15 to 25 percent by weight. Commonly the natural cellulosic fibers include ionic or hydrophilic groups which aid in their water dispersibility. Such fibers are naturally formed and may be lignocellulosic fibers. Representative cellulosic fibers are substantially unrefined wood pulp, cotton linters, waste paper, reclaimed Kraft, etc. The wood pulp may be ground wood pulp, steam-heated mechanical pulp, chemimechancial pulp, semi-chemical pulp, chemical pulp, etc., which can be derived from softwoods or hardwoods. Wood pulp derived from softwoods is preferred. Specific examples are unbleached sulfite pulp, bleached sulfite pulp, unbleached sulfate pulp, and bleached sulfate pulp. In a particularly preferred embodiment, the natural relatively coarse cellulosic fibers are softwood Kraft fibers derived from corrugated box scrap.

The relatively coarse cellulosic fibers selected for use in the present invention possess a Canadian standard freeness at 0.3 percent consistency greater than 600 ml. (e.g., approximately 620 to 800 ml.). In a preferred embodiment, the Canadian standard freeness of such cellulosic fibers is approximately 620 to 720 ml., and most preferably approximately 650 to 700 ml. Such Canadian standard freeness test can be carried out in accordance with the standard procedure described in TAPPI Test Method T227 os-58. The relatively coarse nature of the natural cellulosic fibers has been found to be necessary to achieve sufficiently rapid drainage and water removal during a wet-laying mat formation technique while preventing segregation of particulate polymeric and inorganic materials thereby providing an acceptable uniformity of distribution throughout the thickness of the mat and a good retention of particulate components.

Thermoplastic synthetic polymer fibrils having a melting temperature below 450° F. constitute the second-essential component of the thermoformable mats of the present invention. The synthetic polymer fibrils preferably have a melting temperature below 400° F. (e.g., in the range of approximately 270° to 330° F.). Such fibrils are provided in a relatively low concentration of approximately 10 to 25 percent by weight on a dry basis, and preferably in a concentration of approximately 15 to 20 percent by weight on a dry basis. Representative classes of thermoplastic synthetic polymer fibrils are polyolefins, polyesters, polyamides, and polyvinylchloride. In a preferred embodiment the thermoplastic synthetic polymer fibrils are a polyolefin, such as polyethylene or polypropylene. The synthetic polymer fibrils suitable for use in the present invention are sometimes identified as "synthetic pulp" and are fine, highly branched, discontinuous water-dispersible fibers.

Highly satisfactory synthetic polymer fibrils for use in the present invention are available from Hercules Incorporated and are marketed as PULPEX polyolefin pulps. In a preferred embodiment, the synthetic polymer fibrils have a length of approximately 0.6 to 2.5 mm., and most preferably a length of approximately 0.6 to 1.2 mm. A fibril denier of approximately 1 to 15 commonly is selected. Such fibrils in a preferred embodiment possess an aspect ratio of approximately 15:1 to 85:1, and in a particularly preferred embodiment possess an aspect ratio of approximately 15:1 to 40:1. Such fibrils in conjunction with the other mat components greatly aid the uniform thermoforming of the mats.

Non-fibrous thermoplastic synthetic polymer particles having a melting temperature below 450° F. constitute the third essential component of the thermoformable mats of the present invention. The thermoplastic particles preferably have a melting temperature below 400° F. (e.g., in the range of 270° to 330.F.) and preferably are substantially the same chemically as the thermoplastic synthetic polymer fibrils. Such thermoplastic polymer particles are relatively inexpensive and are provided in a concentration of approximately 15 to 30 percent by weight on a dry basis, and preferably in a concentration of approximately 20 to 25 percent by weight on a dry basis. Representative non-fibrous thermoplastic synthetic polymer particles are polyolefins, polyesters, polyamides, and polyvinylchloride. In a preferred embodiment the non-fibrous thermoplastic polymer particles are a polyolefin, such as polyethylene or polypropylene. Also, in a preferred embodiment, the non-fibrous thermoplastio synthetic polymer particles have a particle size of approximately 0.075 to 0.6 mm., and most preferably have a particle size of approximately 0.15 to 0.25 mm. Such non-fibrous particles can be formed by grinding the polymer using known technology. Thermoplastic synthetic polymer scrap following grinding can be used to advantage since it is relatively inexpensive and results in an additional cost savings.

It is beneficial but not essential that the thermoplastic synthetic polymer fibrils and the non-fibrous thermoplastic synthetic polymer particles be substantially the same chemically or at least compatible in the melt so that strong thermal bonding takes place between the same. Accordingly upon thermal bonding the thermoplastic polymer fibrils and non-fibrous thermoplastic synthetic polymer particles will coalesce to form a substantially continuous matrix. In a particularly preferred embodiment the sum of thermoplastic synthetic polymer fibrils and the thermoplastic synthetic polymer particles in the thermoformable mats of the present invention is approximately 38 to 42 percent by weight.

A substantially void-free substantially water-insoluble particulate inorganic material constitutes the fourth essential component of the thermoformable mats of the present invention. Such material may be selected from among fillers previously employed in felts, papers, and plastics. Such particles are relatively inexpensive. These particles are provided in the mats of the present invention in a concentration of approximately 25 to 40 percent by weight on a dry basis, and preferably in a concentration of approximately 25 to 35 percent by weight on a dry basis. Representative substantially void-free substantially water-insoluble particulate inorganic materials are talc, calcium carbonate, clay, vermiculite, mica, titanium dioxide, amorphous silica, zinc oxide, barium sulfate, calcium sulfate, aluminum silicate, magnesium silicate, aluminum trihydrate, magnesium carbonate, and mixtures of two or more of these. In a particularly preferred embodiment talc is utilized. Also, in a preferred embodiment the particle size of the inorganic particulate material is approximately 40 to 200 microns, and approximately 40 to 150 microns in a particularly preferred embodiment.

A particulate void-containing substantially waterinsoluble inorganic material having a density less than that of the substantially void-free substantially water-insoluble particulate inorganic material constitutes the fifth essential component of the thermoformable mats of the present invention. Such material may be selected from among low density fillers previously utilized in felts, papers, and plastics. These particles are provided in the mats of the present invention in a concentration of approximately 10 to 20 percent by weight on a dry basis, and preferably in a concentration of approximately 13 to 18 percent by weight on a dry basis. Representative particulate void-containing substantially water-insoluble inorganic materials are expanded volcanic glass, diatomaceous earth, synthetically produced glass microspheres, ceramic microspheres, and mixtures of two or more of these. Expanded volcanic glass particles are particularly preferred and are commercially available. These are mineral-based silicate products formed by the expansion through heating, milling, and sizing of naturally occurring glass found where there has been volcanic activity. For instance, these are available from Grefco, Inc. under the PERLITE and DICALITE functional filler designations. As is well known, the diatomaceous earth fillers are largely silica and are formed by the milling of skeletons of small prehistoric diatoms, etc. Representative synthetic glass microspheres are commercially available from Grefco, Inc. under the DICAPERL hollow glass microsphere designation. In a preferred embodiment the particle size of the void-containing substantially water-insoluble inorganic material is approximately 5 to 200 microns, and most preferably approximately 30 to 150 microns. Such particles also preferably have an effective density of approximately 15 to 40 lbs./ft.$^3$ and most preferably have an effective density of approximately 20 to 35 lbs./ft.$^3$. If desired, such particles optionally may be surface treated to improve bonding to the thermoplastic matrix which results upon densification and thermoforming. Representative surface treatment agents include stearic acid, calcium stearate, silanes, titanates, and the like.

As discussed hereafter, minor amounts of other additional components other than a binder may be present in the mats of reduced density of the present invention so long as the basic character of the product is not substantially changed.

Since the natural relatively coarse cellulosic fibers present in the mat tend to be slightly hygroscopic prior to densification and thermoforming, it is contemplated that the mat be well dried to expel adhering moisture while heating at a moderate temperature well below the melting temperature of the thermoplastic components (e.g., at 160° F.) prior to computing the percent by weight of each component. Accordingly, the "on a dry basis" terminology used herein contemplates that any adhering water has been expelled and does not enter into the calculation.

In a particularly preferred embodiment the thermoformable mat of reduced density of the present invention constitutes approximately 17 percent by weight on a dry basis of the relatively coarse cellulosic fibers, approximately 18 percent by weight on a dry basis of the thermoplastic synthetic polymer fibrils, approximately 20 percent by weight on a dry basis of the substantially non-fibrous thermoplastic synthetic polymer particles, approximately 30 percent by weight on a dry basis of the substantially void-free substantially water-insoluble particulate inorganic material, and approximately 15 percent by weight on a dry basis of the particulate void-containing substantially water-insoluble inorganic material.

It is preferred that the relatively inexpensive thermoformable mats of reduced density of the present invention be formed by wet-laying from an aqueous dispersion. Such technique has been found to be capable of producing a highly uniform product. In a particularly preferred embodiment the mats are formed by the dewatering of an aqueous dispersion containing the five essential components with the use of a flocculant to aid the agglomeration of particles, a paper-making machine (e.g., a Fourdrinier machine) to form a wet web from which excess water is drained, roller presses to remove water, and a drier to further reduce the water content while maintaining the mat at all times at a temperature below the melting temperature of the thermoplastic polymer components. During such formation, hydrogen bonding among adjacent natural cellulosic fibers advantageously serves to impart wet strength to the resulting mat and to aid in the entrapment of particulate components among the fibrous components.

The flocculating agent may be selected from among those agents heretofore utilized in paper and felt manufacture. Such flocculating agents are sometimes called "deposition aids" and serve to coalesce at the appropriate time in the formation process the dispersion so that the particulate components present therein are deposited among and between the fibrous components as the wet mat is formed. The flocculating agents do not serve a binding function. Such flocculating agents commonly are water-dispersible ionic compounds or polymers. The ionic charge of the flocculating agent typically is opposite to that of the dispersed particles. Representative flocculants which may be employed include cationic starch; water-soluble inorganic salts such as alum, aluminum sulfate, calcium chloride, and magnesium chloride; and water-soluble ionic organic polymers such as polyethyleneimine and ionic polyacrylamides. Combinations of flocculating agents may be selected. The use of water-soluble ionic organic polymers as flocculants is preferred. The flocculating agents commonly are introduced in a concentration of approximately 0.02 to 0.1 percent by weight of the mat to a previously prepared substantially uniform aqueous dispersion of the mat-forming components which are provided in the aqueous dispersion in a concentration of approximately 0.5 to 6 percent by weight (e.g., approximately 1 to 5 percent by weight).

If minor amounts of other components other than a binder optionally are included in the mats of the present invention, these too are present in the aqueous dispersion at the time the flocculant is introduced. It is essential that these additional components do not alter the basic character of the mats of reduced density of the present invention. Representative optional components which may be included in a minor concentration are inorganic fibers, wet end additives, antioxidants, colorants, pigments, flame retardants, biocides, etc.

Representative continuous paper-making machines which may be selected for use when forming the relatively inexpensive thermoformable mats of reduced density of the present invention include a Fourdrinier machine, a cylinder machine, a suction machine such as a Rotoformer, millboard equipment, etc. Particularly good results have been achieved through the use of a Fourdrinier machine. For further details, reference can be made to the general summary of paper and paper making found in the Kirk-Othmer Encyclopedia of Chemical Technology at pages 494 to 510 which was published by Interscience Publishers, Inc. (New York, N.Y. 1967).

Initially the components of the aqueous dispersion are admixed by stirring with water for a sufficient period of time to obtain a substantially uniform admixture having a higher concentration of solids than that utilized when flocculation is carried out. Typically such higher concentration will be approximately 12 to 18 percent by weight and aids in the dispersion. Water typically is added with stirring to produce a substantially uniform dispersion having a solids content of approximately 0.5 to 6 percent (e.g., preferably approximately 1 to 5 percent by weight) prior to the addition of the flocculant. The flocculant is added with stirring and the dispersion next is transferred to the paper-making machine. Drainage of excess water from the continuous wet web readily is accomplished as water passes through the wire of the machine. The resulting web subsequently may be passed through roller presses adjusted to achieve the appropriate mat thickness and then through circulating air-drying ovens or over heated drums. It is essential that the resulting mat at all times during its formation be maintained at a temperature below that at which its thermoplastic polymer components melt.

The resulting thermoformable mats of reduced density of the present invention readily can be incorporated into a rigid article formed by thermoforming when subjected to heat and pressure. The thermoforming may be carried out in platen heaters or in similar equipment. During such thermoforming it is essential that the resulting mats be heated to a temperature which exceeds the melting temperature of the thermoplastic synthetic polymer components. Care is taken, however, not to heat the mats to a temperature which would cause any substantial degradation to the cellulosic fiber components. Suitable pressures to accomplish densification and thermoforming commonly range from approximately 50 to 200 psi. During thermoforming the thermoplastic synthetic polymer fibrils and the non-fibrous thermoplastic synthetic polymer particles are deformed and are caused to flow and to surround the cellulosic fibers, the substantially void-free substantially water-insoluble particulate inorganic material, and the particulate void-containing substantially water-insoluble inorganic material, where they serve as a substantially continuous matrix phase. The cellulosic fibers serve as fibrous reinforcement in the densified product and the inorganic particles impart stiffness to the resulting rigid product. Also, the particulate void-containing substantially water-insoluble inorganic material contributes to the heat deflection properties of the final product. The respective components are provided in the requisite concentrations found to achieve an attractive product even in the absence of a binder. The product is allowed to cool prior to pressure release and removal from the mold in which thermoforming is accomplished. No curing step is required as in prior art thermoforming operations which utilize a thermosetting resin.

Following densification and thermoforming the product of the present invention commonly exhibits a density of approximately 50 to 65 lbs./ft.$^3$ (e.g., approximately 55 to 60 lbs./ft.$^3$) and a single mat or ply thickness of approximately 10 to 35mils (e.g., approximately 15 to 30 mils).

The product of the present invention can be utilized in those applications where a low cost rigid thermoformed sheet of reduced density is required. In a preferred embodiment a cellulosic fiber reinforced thermoformed skin-core laminate of reduced density is formed by the application of heat and pressure to a plurality of the mats while in a stacked configuration together with similar mats of greater density on at least the upper and lower surfaces which contain less of component (e) and more of component (d) at a temperature in excess of the melting temperature of the thermoplastic synthetic polymer fibrils and the nonfibrous thermoplastic synthetic polymer particles wherein thermal bonding takes place within and between adjacent mats. The mats on the upper and lower surfaces can be formed in accordance with the teachings of our copending U.S. Ser. No. 944,227, filed concurrently herewith, entitled "Relatively Inexpensive Thermoformable Mat And Rigid Laminate Formed Therefrom" which is herein incorporated by reference. In a preferred embodiment component (e) is totally replaced by a like quantity of component (d) in the mats on at least the upper and lower surfaces. The absence of the void-containing inorganic component on the surface produces a final product of reduced density while retaining substantial stiffness. For instance, approximately two to five, or more, of the mats of the present invention may be thermally bonded while in a stacked configuration with one or more o the higher density mats on each surface. Commonly the lesser density at a central location in the laminate is within the range of approximately 50 to 65 lbs./ft$^3$ and the greater density on the upper and lower surfaces is within the range of approximataly 60 to 75 lbs./ft.$^3$. One accordingly has the option readily to form thermoformed articles of reduced density having a variety of thicknesses without the need to inventory a number of different starting materials. In an alternate embodiment the mats while in a stacked substantially flat configuration initially are subjected to heat and pressure wherein densification and thermal bonding take place and subsequently while the resulting densified and thermally bonded mats are present in a mold wherein a different configuration is imparted (i.e., a contoured configuration).

The skin-core laminates of the present invention are attractive strong lightweight products. The core plies of lower density impart an increased flex yield strength to the overall product per unit of density, and the skin plies of increased density impart an increased strength to the overall product than that otherwise would be possible if the skin plies were omitted.

The resulting cellulosic fiber reinforced product can be used to advantage as a shaped rigid panel of reduced density for use as an inner automobile door liner or in similar automotive end uses such as spare wheel covers which require a rigid sheet or panel having a predetermined configuration. Representative non-automotive uses for the product include furniture panels, interior/exterior partitions, molded doors, etc. A decorative surface optionally may be applied to the product either before or after thermoforming.

The following example is presented as a specific illustration of the claimed invention. It should be understood, however, that the invention is not limited to the specific details set forth in the Example.

EXAMPLE

An aqueous dispersion is prepared which is capable of producing a mat of reduced density in accordance with the present invention containing (a) approximately 17 percent by weight on a dry basis cellulosic fibers having a Canadian standard freeness at 0.3 percent consistenoy of approximately 650 ml., (b) approximately 18 percent by weight on a dry basis of polyethylene fibrils having a melting temperature of 270° F., lengths of approximately 0.6 to 1.2 mm. and aspect ratios of approximately 15:1 to 40:1, (c) approximately 20 percent by weight on a dry basis of non-fibrous polyethylene particles having a melting temperature of approximately 270° F., and a particle sizes of approximately 0.15 to 0.25 mm., (d) approximately 30 percent by weight on a dry basis of finely ground talc having a particle size of approximately 40 to 200 microns, and approximately 15 percent by weight on a dry basis of expanded volcanic glass having a particle size of approximately 30 to 150 microns and an effective density of 27 lbs./ft.$^3$No binder is present in the aqueous dispersion.

The relatively coarse cellulosic fibers are provided primarily as softwood Kraft corrugated box stock having a weight of approximately 750 lbs. on a dry basis.

The polyethylene fibers are obtained from Hercules Incorporated under the PULPEX E-CP polyolefin pulp designation. One thousand pounds of this material on a dry basis is provided which contributes approximately 920 lbs. of polyethylene fibrils and an additional approximately 80 lbs. of cellulosic fibers.

The non-fibrous polyethylene particles are obtained from the Soltex Polymer Corporation under the T60-1000 polyethylene flake designation. Approximately 1000 lbs. of this component on a dry basis are utilized.

The finely ground talc is obtained from Talc B.S.Q. Inc. Approximately 1500 lbs. of this component on a dry basis are utilized.

The expanded volcanic glass particles are obtained from Grefco, Inc. under the DICAPERL XSP designation. 15 bags or approximately 750 lbs. of this component on a dry basis are utilized.

The five essential components are substantially uniformly dispersed in water via mechanical stirring sufficient to break up the Kraft corrugated box stock and insufficient to alter the relatively coarse nature of the cellulosic fibers in an initial concentration of 18 percent solids by weight while the water is at a temperature of approximately 100.F. Additional water is added and the total solids content is reduced to approximately 2 percent by weight.

As the aqueous dispersion is brought to the head box of a Fourdrinier machine, 15 lbs. on a dry basis of cationic acrylamide flocculant available from Dow Chemical Company under the Separan 412 designation are added which facilitate the agglomeration of the aqueous dispersion. A wet-laid mat derived from the aqueous dispersion next is laid on the moving wire of the Fourdrinier machine where it is drained, is passed through roller presses to further reduce the water content, and subsequently is dried by sequential contact with approximately 18 steam-heated drier drums provided at approximately 250.F. prior to being taken up as a roll.

The resulting product has a thickness of 35 mils and a density of 25 lbs./ft.$^3$ and comprises a random array of the five essential components. The polyethylene particles, the talc particles, and the expanded volcanic glass particles are substantially dispersed among and substantially physically retained by entrapment by the Kraft fibers and the polyethylene fibrils. The product is flexible typical of felts and paper and can be readily handled without any significant loss of polyethylene particles, the talc particles, and the expanded volcanic glass particles.

FIG. 1 illustrates a section of a single ply 1 of the resulting mat. As illustrated in FIG. 2, three plies of the mat 1, 3, and 5 are stacked and are placed between similarly prepared mats of higher density 2 and 4 which lack the expanded volcanic glass component but instead include a like additional quantity of talc by weight. Mats 2 and 4 are prepared in accordance with the example of our previously identified copending application. The five plies of FIG. 2 while dry are placed in a platen heater heated at 350° F. and are retained therein until a mat temperature of 330° F. is reached whereupon the mats are placed while at such temperature in a contoured mold provided at 230° F. for 60 seconds while under a pressure of 100 psi to form a densified thermally bonded laminate in the form of the contoured inner automobile door liner 20 of FIG. 4. The resulting shaped five ply laminate has a thickness of 100 mils, a density of 60 lbs./ft.$^3$ at the center, a density of 67 lbs./ft.$^3$ on the upper and lower surfaces, a cross-machine direction modulus of 430,000 psi, and a cross-machine direction yield strength of 5,200 psi.

Although the invention has been described with a preferred embodiment, it is to be understood that variations and modifications may be employed without departing from the concept of the invention as defined in the following claims.

We claim:

1. A relatively inexpensive wet laid mat having a single ply thickness of approximately 15 to 60 mils and a density of approximately 20 to 40 lbs./ft.$^3$ capable of undergoing densification and thermoforming upon the application of heat and pressure consisting essentially of a substantially random array of:
    (a) approximately 15 to 35 percent by weight on a dry basis of natural relatively corase cellulosic fibers having a Canadian standard freenes of 0.3 percent consistency of greater than 600 ml.,
    (b) approximately 10 to 25 percent by weight on a dry basis of thermoplastic synthetic polymer fibrils having a melting temperature below 450° F.,
    (c) approximately 15 to 30 percent by weight on a dry basis of substantially non-fibrous solid particulate thermoplastic synthetic polymer particles having a particle size of approximately 0.075 to 0.6 mm. and a melting temperature below 450° F.,
    (d) approximately 25 to 40 percent by weight on a dry basis of substantially void-free substantially water-insoluble solid particulate inorganic material, and
    (e) approximately 10 to 20 percent by weight on a dry basis of solid particulate void-containing substantially water-insoluble inorganic material having a lesser density than component (d), with said web being substantially free of a binder and said components (c), (d), and (e) being substantially dispersed among and substantially physically retained via entrapment by said components (a) and (b).

2. A relatively inexpensive mat capable of undergoing thermoforming according to claim 1 having a thickness of approximately 30 to 45 mils.

3. A relatively inexpensive mat capable of undergoing thermoforming according to claim 1 which has a density of approximately 20 to 30 lbs./ft.$^3$ 4. A relatively inexpensive mat capable of undergoing thermoforming according to claim 1 which was formed by wet-laying components (a), (b), (c), (d), and (e) from an aqueous dispersion.

5. A relatively inexpensive mat capable of undergoing thermoforming according to claim 1 which was formed through the de-watering of an aqueous dispersion of components (a), (b), (c), (d), and (e) with the use of a flocculant to aid the agglomeration of particles, a Fourdrinier machine to form a wet web from which water is drained, roller presses to remove water, and a drier to reduce the water content while maintaining said mat at all times at a temperature below the melting temperature of components (b) and (c).

6. A relatively inexpensive mat capable of undergoing thermoforming according to claim 1 wherein said cellulosic fibers of component (a) are substantially unrefined wood pulp.

7. A relatively inexpensive mat capable of undergoing thermoforming according to claim 1 wherein said cellulosic fibers of component (a) are softwood Kraft fibers.

8. A relatively inexpensive mat capable of undergoing thermoforming according to claim 1 wherein said thermoplastic synthetic polymer fibrils of component (b) have a melting temperature of approximately 270° to 330° F.

9. A relatively inexpensive mat capable of undergoing thermoforming according to claim 1 wherein said thermoplastic synthetic polymer fibrils of component (b) are selected from the group consisting of polyolefins, polyesters, polyamides, and polyvinylchloride.

10. A relatively inexpensive mat capable of undergoing thermoforming according to claim 1 wherein said thermoplastic synthetic polymer fibrils of component (b) are approximately 0.6 to 2.5 mm. in length and possess an aspect ratio of approximately 15:1 to 85:1.

11. A relatively inexpensive mat capable of undergoing thermoforming according to claim 1 wherein said thermoplastic synthetic polymer fibrils of component (b) are approximately 0.6 to 1.2 mm. in length and possess an aspect ratio of approximately 15:1 to 40:1.

12. A relatively inexpensive mat capable of undergoing thermoforming according to claim 1 wherein said thermoplastic substantially non-fibrous synthetic polymer particles of component (c) are substantially the same chemically as said thermoplastic synthetic polymer fibrils of component (b).

13. A relatively inexpensive mat capable of undergoing thermoforming according to claim 1 wherein said thermoplastic substantially non-fibrous synthetic polymer particles of component (c) have a melting temperature of approximately 270° to 330° F.

14. A relatively inexpensive mat capable of undergoing thermoforming according to claim 1 wherein said thermoplastic substantially non-fibrous synthetic polymer particles of component (c) are selected from the group consisting of polyolefins, polyesters, polyamides, and polyvinylchloride.

15. A relatively inexpensive mat capable of undergoing thermoforming according to claim 1 wherein said thermoplastic substantially non-fibrous synthetic polymer particles of component (c) possess a particle size of approximately 0.15 to 0.25 mm.

16. A relatively inexpensive mat capable of undergoing thermoforming according to claim 1 wherein said components (b) and (c) are formed of polyethylene.

17. A relatively inexpensive mat capable of undergoing thermoforming according to claim 1 wherein the sum of components (b) and (c) is approximately 38 to 42 percent by weight on a dry basis.

18. A relatively inexpensive mat capable of undergoing thermoforming according to claim 1 wherein said particulate substantially void-free substantially water-insoluble particulate inorganic material of component (d) has a particle size of approximately 40 to 200 microns.

19. A relatively inexpensive mat capable of undergoing thermoforming according to claim 1 wherein said particulate substantially void-free substantially water-insoluble particulate inorganic material of component (d) has a particle size of approximately 40 to 150 microns.

20. A relatively inexpensive mat capable of undergoing thermoforming according to claim 1 wherein said particulate substantially void-free substantially water-insoluble particulate inorganic material of component (d) is selected from the group consisting of talc, calcium carbonate, clay, vermiculite, mica, titanium dioxide, amorphous silica, zinc oxide, barium sulfate, calcium sulfate, aluminum silicate, magnesium silicate, aluminum trihydrate, magnesium carbonate, and mixtures of two or more of the foregoing.

21. A relatively inexpensive mat capable of undergoing thermoforming according to claim 1 wherein said particulate substantially void-free substantially water-insoluble particulate inorganic material of component (d) is talc.

22. A relatively inexpensive mat capable of undergoing thermoforming according to claim 1 wherein said particulate void-containing substantially water-insoluble inorganic material of component (e) has a particle size of approximately 5 to 200 microns and an effective density of approximately 15 to 40 lbs./ft.$^3$.

23. A relatively inexpensive mat capable of undergoing thermoforming according to claim 1 wherein said particulate void-containing substantially water-insoluble inorganic material of component (e) has a particle size of approximately 30 to 150 microns and an effective density of approximately 20 to 35 lbs./ft.$^3$.

24. A relatively inexpensive mat capable of undergoing thermoforming according to claim 1 wherein said particulate voidcontaining substantially water-insoluble inorganic material of component (e) is selected from the group consisting of expanded volcanic glass, diatomaceous earth, synthetically produced glass microspheres, ceramic microspheres, and mixtures of two or more of the foregoing.

25. A relatively inexpensive mat capable of undergoing thermoforming according to claim 1 which comprises approximately 17 percent by weight of component (a), approximately 18 percent by weight of component (b), approximately 20 percent by weight of component (c), approximately 30 percent by weight of component (d), and approximately 15 percent by weight of component (e).

26. A cellulosic fiber reinforced thermoformed laminate formed by the application of heat and pressure to a plurality of the mats of claim 1 while in a stacked configuration together with similar mats of greater density on at least the upper and lower surfaces which contain less of component (e) and more of component (d) wherein the stacked mats are heated at a temperature in excess of the melting temperature of said thermoplastic synthetic polymer of components (b) and (c) and densification takes place within said mats and thermal bonding takes place within and between adjacent mats, said thermoformed laminate having a lesser density at a central location within the range of approximately 50 to 65 lbs./ft.$^3$ and a greater density at the upper and lower surfaces within the range of approximately 60 to 75 lbs./ft.$^3$.

27. A cellulosic fiber reinforced thermoformed laminate according to claim 26 wherein said mats of greater density on at least the upper and lower surfaces are substantially free of component (e).

28. A cellulosic fiber reinforced thermoformed laminate according to claim 26 wherein the center comprises approximately two to five of said thermally bonded mats of lesser density.

29. A cellulosic fiber reinforced thermoformed laminate according to claim 26 wherein heat and pressure initially were applied while said mats were in a substantially flat configuration and subsequently while the resulting densified and thermally bonded mats were present in a mold wherein a different configuration was imparted.

* * * * *